Patented Apr. 24, 1951

2,550,398

UNITED STATES PATENT OFFICE 2,550,398

ANTIBIOTIC COMPOSITIONS

Alfred Barol, Philadelphia, Pa., assignor to Wyeth Incorporated, Philadelphia, Pa., a corporation of Delaware No Drawing. Application March 17, 1948, Serial No. 15,511

7 Claims. (Cl. 167—58)

This invention relates to antibiotic compositions and particularly relates to compositions containing an antibiotic and a vasoconstrictor for topical, oral administration.

In topical medication, and specifically topical medication to the mucous membranes of the nose, sinuses and throat, a composition comprising an antibiotic and a vasoconstricting agent has been found to be highly efficacious in reducing bacterial infection and congestion arising from colds, sinusitis, allergic and catarrhal rhinitis and allied disorders.

Penicillin has been found to be highly effective for treating infections of the oral cavities and passages. However, this antibiotic is known to be unstable in the presence of water, acids and/or bases, and this factor must be taken into consideration in the preparation of compositions containing this easily destroyed antibiotic. For example, when the problem of introducing penicillin into the body by the oral route was studied, it was quickly recognized that gastric acidity destroyed and inactivated penicillin and thus resulted in undesirably low penicillin blood levels. It is also known that penicillin is unstable in water solution and it has been found that a proper pH must be maintained to avoid complete destruction. Thus, in contemplating the preparation of a composition containing a highly unstable antibiotic such as penicillin, the problem is to avoid aqueous or excessively acid or basic environments.

While the antibiotic acts to reduce and minimize bacterial infection it is not effective by itself to relieve all the symptoms of oral cavity disorders. Consequently, in order to also reduce nasal congestion, a highly effective composition is achieved when a vasoconstricting agent is combined with the antibiotic.

The vasoconstricting agent suitable for use in the composition may be any vasoconstrictor agent capable of acting as a nasal decongestant. Suitable vasoconstrictors may be aromatic compounds of the phenylethylamine class or branched-chain aliphatic compounds. As examples of specific agents may be mentioned epinephrine, ephedrine, β-phenylethylamine, dl-desoxyephedrine, methylamino acetocatechol; 1 - (m-hydroxyphenyl) -2-methylaminoethanol; the para-hydroxy derivative of the latter compounds; 1-phenyl-2-aminopropane; 1-phenyl-2-aminopropanol - 1; m,p-dihydroxy - phenyl propanolamine; m,p - dihydroxyphenylethylmethylamine; 2-phenyl-n-propylmethylamine; 1-phenyl - 2,2 - dimethyl-2-methylamino ethane; p-hydroxyphenyl - 2 - aminopropane; 2 - (naphthyl- (1') - methyl) imidazoline, 2 - aminoheptane, 2-methylamino heptane. It should be clearly understood that these are merely examples of suitable vasoconstrictors and it will be apparent to those skilled in the art that many other pressor amines or their salts would be operable.

These aromatic and aliphatic pressor or sympathominetic amines may be used as the free base but are generally obtained and used in the form of their salts. The salts are formed by reacting the weak amino base with an organic or mineral acid, such as tartaric acid, sulfuric acid or the halogen acids as, for example, hydrochloric acid.

The essential difficulty of mixing vasoconstrictor salts with penicillin is that these salts have a strong acid reaction and so would normally tend to destroy penicillin. As the free base, these agents also cause the destruction of penicillin, this time because of their basic reaction. Thus, whether used in the form of the salt or as the free base itself, the vasoconstricting agent is sufficiently reactive to cause the destruction of any acid or base-sensitive antibiotic such as penicillin.

Still another factor leading to the destruction of an antibiotic such as penicillin, is an aqueous environment, even in small amounts. As pointed out above, it is well-known that aqueous solutions of penicillin are unstable. Actually, in commercial preparations of oral penicillin compositions intended for a gastric environment, an important problem is the prevention of the destruction of penicillin not only by the gastric juices but also by atmospheric moisture, and elaborate precautions are taken to indicate and prevent, if possible, the inactivation of the antibiotic. In spite of such precautions, the shelf life of penicillin compositions has often been found to be quite low.

Prior to the discovery of the novel composition disclosed herein, a single composition containing both antibiotic and vasoconstrictor has not been available as a dry, stable, admixture capable of long shelf life and immediately effective when merely dissolved in water although the advantages of a single complete composition of this nature are obvious.

At the present time separate containers of antibiotic and vasoconstrictor are provided since it is appreciated that these materials are ordinarily chemically incompatible.

Thus, because of the sensitivity of penicillin, admixtures of penicillin and a vasoconstrictor such as ephedrine hydrochloride were heretofore considered impractical and it is therefore easily understood why commercial preparations were required to have the penicillin and the vasoconstrictor salts in separate packages to be admixed by the pharmacist or physician only when substantially immediate use was contemplated.

A primary object of the invention, therefore, is the provision of a relatively stable and therapeutically effective penicillin composition having a long shelf life.

A further object of the invention is the provision of a relatively stable and therapeutically effective composition containing penicillin and a vasoconstricting agent in admixture.

Further objects will become apparent from the disclosure herein.

It has been found that a highly stable and therapeutically effective composition of antibiotic and vasoconstrictor can be obtained if there is provided a specially treated buffering agent as an additional element in the composition. Buffering agents useful in the composition should be such as to prevent the vasoconstrictor from destroying the antibiotic. Thus, assuming the vasoconstrictor to be acid in reaction as is usually the case, the buffering agent should be such as to counteract the acidity of the vasoconstrictor and thus protect the antibiotic from an acid environment.

Compounds suitable as buffering agents for an ordinarily acid environment are salts of relatively strong bases and weak acids which have a neutral to alkaline reaction. Thus, trisodium citrate is considered a most advantageous buffering agent but other buffering agents such as disodium tartrate, sodium lactate and sodium malate are also highly satisfactory. Other buffering agents that are effective are sodium acetate, tripotassium citrate, disodium or dipotassium succinate, disodium or dipotassium phosphate, disodium or dipotassium fumarate, disodium or dipotassium saccharate, disodium malonate, sodium gluconate, potassium gluconate, magnesium citrate, calcium lactate, calcium phosphate, magnesium lactate, magnesium acetate, magnesium gluconate, calcium gluconate, magnesium fumarate, magnesium malonate, magnesium succinate and magnesium tartrate. These compounds do not complete the list of operable buffering agents but from those mentioned it may be seen that any compound having a neutral to slightly alkaline reaction and capable of exerting a buffering action in an acid environment would be effective. As stated before, salts of relatively weak acids, preferably organic acids and relatively strong bases, make satisfactory buffering agents.

It may be noted that the buffering agent in the composition may be a single salt or a mixture of salts which will give a substantial buffering action, an example of the latter being disodium citrate and disodium phosphate or sodium acetate and sodium tartrate. It should be realized of course that the buffering agent must in any event be non-toxic or at least non-toxic in the amount used.

Of almost equal importance to the use of a buffering agent to counteract the reactivity of the vasoconstricting agent against the antibiotic is the concept that the elements of the composition must be substantially anhydrous. What is not generally recognized is that penicillin is unstable in an aqueous environment even though the aqueous medium is buffered. It must be realized that many vasoconstricting agents ordinarily contain a material percentage of water. Moreover many buffering agents, while highly effective for counteracting the acidity of the vasoconstrictor salt, contain some water and often water of crystallization. It was conceived that unless made anhydrous by removal of substantially all the water, including water of crystallization, the buffering agent would be ineffective for protecting the penicillin against substantial destruction. A particularly desirable quality of an antibiotic composition is that it has long shelf life and any material which contains water reduces the shelf life of the composition to the point where it is commercially valueless or unduly expensive.

The removal of substantially all water and including water of crystallization from the buffering agent must be carefully done to avoid charring, decomposition and chemical changes in the agent. For example, removal of water of crystallization in the case of trisodium citrate involves careful heating to approximately 150° C. without heating materially above this temperature.

With regard to the various proportions of the separate ingredients, the amount of buffering agent in the composition may be varied widely and depends primarily on the vasoconstricting agent and the amount used. For a buffering action only the amount needed is based on stoichiometric equivalency to the vasoconstrictor used. For example, if the vasoconstricting agent is a salt of ephedrine and the buffering agent is anhydrous sodium citrate, one should use one mol of sodium citrate for each mol of the hydrochloride and two mols of sodium citrate for each mol of the sulphate.

While the stoichiometric relationship, indicated above, between the buffer and the vasoconstrictor is all that is necessary for protecting the penicillin, one may use more buffer than the minimal requirement. For example, it is generally recognized that the tonicity of the tears represents the desirable salt concentration for all fluids which are used in the nasal cavity and thus sufficient buffering agent may be present so that when put into solution, the composition is isotonic with the tears.

With regard to the penicillin component the amount of either the crystalline or of the amorphous type useful for application to the nasal passages should be not less than about 500 International units per c. c. of solution and may, of course, be present in a much higher unitage than the minimum indicated. A preferred strength is about 2,000 International units per c. c. of solution.

The amount of vasoconstrictor in the composition is so selected in order to obtain a strength in solution which may range from about 0.1% to about 3.0%. The preferred amount is that which results in a 0.5% solution when dissolved in water.

It has generally been found that the composition is improved by the presence of a preservative to prevent growth of microorganisms although this is not an essential ingredient in the basic formulation. Such well-known preservatives as benzyl alcohol, sodium benzoate or phenol are examples of useful preservatives. A preferred preservative is methyl para-hydroxy benzoate.

A therapeutically effective and substantially stable and dry composition illustrative of the invention is given hereinbelow but it is to be distinctly understood that this example is merely illustrative and not to be considered limitative of the amounts or of the particular ingredients. The amounts given are based on dry weight, the composition being intended for solution in 16 cc. of water.

| Ingredients | Amounts |
| --- | --- |
| Calcium penicillin _____ I. U__ | 40,000 |
| Ephedrine sulfate _____ mgs__ | 80 |
| Sodium citrate anhydrous _____ mgs__ | 610 |
| Citric acid anhydrous _____ mgs__ | 40 |
| Methyl p-hydroxy benzoate _____ mgs__ | 16 |

The above formulation when added to 16 cc. of water makes up into a single therapeutically effective dilution of convenient size. Sufficient buffering agent has been added to yield a solution isotonic with tears. The citric acid in the formulation is merely for the purpose of adjusting the slight natural alkalinity of the sodium citrate to a substantially neutral range.

It is contemplated that the composition of the invention may be prepared and sold in the form of a powder, or in a pill, tablet or lozenge form or preferably, in capsule form. In any of these forms, the composition is ready for use merely by dissolving in water. The dry composition in any of the forms indicated may thus be kept for a relatively long period of time prior to actual use, without deterioration and without substantial loss of antibiotic potency.

Having described my invention, what I claim is:

1. An antibiotic composition having substantial stability under normal atmospheric conditions comprising a substantially dry anhydrous mixture of penicillin, a vasoconstrictor and a buffering agent having a neutral to alkaline reaction.

2. A non-aqueous antibiotic composition having substantial stability under normal atmospheric conditions comprising a dry admixture of penicillin, a vasoconstrictor and a salt of a relatively strong base and weak acid as a buffering agent, said agent having a neutral to alkaline reaction.

3. A substantially anhydrous antibiotic composition having substantial stability under normal atmospheric conditions comprising a dry admixture of penicillin, an aliphatic vasoconstrictor and a salt of a relatively strong base and weak acid as a buffering agent, said agent having a neutral to alkaline reaction.

4. A substantially anhydrous antibiotic composition having substantial stability under normal atmospheric conditions comprising a dry admixture of penicillin, an aromatic vasoconstrictor and a salt of a relatively strong base and weak acid as a buffering agent, said agent having a neutral to alkaline reaction.

5. A substantially anhydrous antibiotic composition having substantial stability under normal atmospheric conditions comprising a dry admixture of penicillin, a salt of ephedrine and a salt of a relatively strong base and weak acid as a buffering agent in an amount at least sufficient to protect a substantial portion of the penicillin against therapeutically significant destruction by said salt, said agent having a neutral to alkaline reaction.

6. A substantially anhydrous antibiotic composition having substantial stability under normal atmospheric conditions comprising a dry admixture of penicillin, a salt of ephedrine and sodium citrate substantially freed of its water of crystallization and having an alkaline reaction, in an amount at least sufficient to protect a substantial portion of the penicillin against therapeutically significant destruction by said salt.

7. A substantially anhydrous antibiotic composition having substantial stability under normal atmospheric conditions comprising a dry admixture of penicillin, a salt of 1-phenyl-2,2-dimethyl-2-methylamino ethane and a salt of a relatively strong base and weak acid as a buffering agent in an amount at least sufficient to protect a substantial portion of the penicillin against therapeutically significant destruction by said amine salt, said agent having a neutral to alkaline reaction.

ALFRED BAROL.

REFERENCES CITED

The following references are of record in the file of this patent:

UNITED STATES PATENTS

| Number | Name | Date |
| --- | --- | --- |
| 2,476,351 | Binkley | July 19, 1949 |

OTHER REFERENCES

Physician's Bulletin, Nov.–Dec. 1945, page 183.
J. Bacteriology, Oct. 1943, pages 386 to 389.
Manufacturing Chemist, Feb. 1947, page 88.
Nature, Feb. 15, 1947, pages 233–234.
Amer. J. Pharmacy, Sept. 1946, page 334.
The Lancet, Mar. 29, 1947, pages 408–410.
J. Amer. Pharm. Assoc., Scientific Edition, Nov. 1946, pages 326–327.
"New Modern Drugs," July 1946, pages 164 and 166 (Yorke Pub. Co. Inc., New York, N. Y.)